(12) United States Patent
Park et al.

(10) Patent No.: US 10,033,689 B2
(45) Date of Patent: Jul. 24, 2018

(54) METHOD FOR ADDRESSING NODE ADDRESS FOR DEVICE MANAGEMENT AND APPARATUS THEREFOR

(71) Applicant: LG Electronics Inc., Seoul (KR)

(72) Inventors: Seungkyu Park, Anyang-si (KR); Seongyun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 14/410,013

(22) PCT Filed: Aug. 22, 2013

(86) PCT No.: PCT/KR2013/007540
§ 371 (c)(1),
(2) Date: Dec. 19, 2014

(87) PCT Pub. No.: WO2014/030942
PCT Pub. Date: Feb. 27, 2014

(65) Prior Publication Data
US 2015/0319131 A1    Nov. 5, 2015

Related U.S. Application Data

(60) Provisional application No. 61/692,207, filed on Aug. 22, 2012, provisional application No. 61/699,869, (Continued)

(51) Int. Cl.
*G06F 15/16* (2006.01)
*H04L 29/12* (2006.01)
(Continued)

(52) U.S. Cl.
CPC ...... *H04L 61/103* (2013.01); *G06F 17/30327* (2013.01); *H04L 41/0233* (2013.01);
(Continued)

(58) Field of Classification Search
CPC .............. H04L 61/103; H04L 41/0233; H04L 41/0206; H04L 41/0213; H04L 67/10; G06F 17/30327
(Continued)

(56) References Cited

U.S. PATENT DOCUMENTS 9,626,667 B2     4/2017  Boccon-Gibod et al.
2007/0156431 A1*  7/2007  Semerdzhiev ......... G06Q 99/00
                                                                 719/310
(Continued)

FOREIGN PATENT DOCUMENTS

EP          2346210 A1 *  7/2011  ......... H04L 41/0206
KR    10-1999-0088682       12/1999
(Continued)

OTHER PUBLICATIONS

Brenners-Lee et al., RFC 3986, Jan. 2005, Network Working Group, p. 21.*
(Continued)

*Primary Examiner* — Tauqir Hussain
(74) *Attorney, Agent, or Firm* — Dentons US LLP

(57) ABSTRACT

The present invention relates to a method for resolving, for device management, a uniform resource identifier (URI) indicating a particular node and an apparatus therefor, the method comprising the steps of: finding one or more MO instances in accordance with a management object identifier (MOID) and MO instance information comprised in the URI; and finding the particular node within the one or more MO instances by means of a path, comprised in the URI, from the MO instance root node to the particular node, wherein if the MO instance information comprises a management object instance identifier (MIID), then the step for finding one or more MO instances comprises finding a unique MO instance having the MOID and MIID, and, if an
(Continued)

MO instance having the MOID and MIID does not exist or exists in multiples, then returning an error.

14 Claims, 10 Drawing Sheets

Related U.S. Application Data filed on Sep. 12, 2012, provisional application No. 61/760,151, filed on Feb. 3, 2013, provisional application No. 61/764,534, filed on Feb. 13, 2013, provisional application No. 61/803,090, filed on Mar. 18, 2013.

(51) Int. Cl.
  *H04L 29/08* (2006.01)
  *G06F 17/30* (2006.01)
  *H04L 12/24* (2006.01)
(52) U.S. Cl.
  CPC .......... *H04L 67/10* (2013.01); *H04L 41/0206* (2013.01); *H04L 41/0213* (2013.01)
(58) Field of Classification Search
  USPC ....................................................... 709/245
  See application file for complete search history.

(56) References Cited

U.S. PATENT DOCUMENTS

| 2007/0185814 | A1 | 8/2007 | Boccon-Gibod et al. |
| 2010/0100899 | A1 | 4/2010 | Bradbury et al. |
| 2010/0299739 | A1* | 11/2010 | Chai ................ H04L 12/24 726/9 |
| 2011/0173685 | A1 | 7/2011 | Chai et al. |
| 2012/0023227 | A1 | 1/2012 | Song et al. |
| 2012/0066367 | A1 | 3/2012 | Chai et al. |

FOREIGN PATENT DOCUMENTS

| KR | 10-2011-0083485 | 7/2011 |
| KR | 10-2011-0093876 | 8/2011 |

OTHER PUBLICATIONS

Berners-Lee, et al.: "Uniform Resource Identifier (URI): Generic Syntax", XP015009757, 5. JCT-VC Meeting; 96. MPEG Meeting; Mar. 16-13, 2011; Geneva; (Joint Collaborative Team on Video Coding of ISO/IEC JTC1/SC29/WG11 and ITU-T SG.16); Internet Engineering Task Force, IETF, CH, Jan. 2005.
OMA: "OMA Device Management Tree and Description—Approved Version 1.2.1", XP055238088, Jun. 17, 2008.

* cited by examiner

```
The following Get command:

<Get>
   <CmdID>4</CmdID>
   <Item>
    <Target>
     <LocURI>./FUMO/PkgName</LocURI>
    </Target>
   </Item>
  </Get> could receive a response like this:

<Results>
   <CmdRef>4</CmdRef>
   <CmdID>7</CmdID>
   <Item>
    <Data>froyo</Data>
   </Item>
  </Results>
```

FIG. 3

```
The following Get command:

<Get>
   <CmdID>4</CmdID>
   <Item>
     <Target>
       <LocURI>./FUMO</LocURI>
     </Target>
   </Item>
  </Get> could receive a response like this:

<Results>
   <CmdRef>4</CmdRef>
   <CmdID>7</CmdID>
   <Item>
     <Meta>
       <Format xmlns='syncml:metinf'>node</Format>
       <Type xmlns='syncml:metinf'>text/plain</Type>
     </Meta>
     <Data>PkgName/PkgVersion/...</Data>
   </Item>
  </Results>
```

FIG. 5

```
<Exec>
<CmdID>4</CmdID>
<Item>
<TargetParent>
<LocURI>./Vendor?MOID=urn:oma:mo:oma_example:1.0&F=Camera&E/G=Foo</LocURI>
</TargetParent>
<Target>
<LocURI>[x]/E/H</LocURI>
</Target>
</Item>
</Exec>
```

FIG. 6
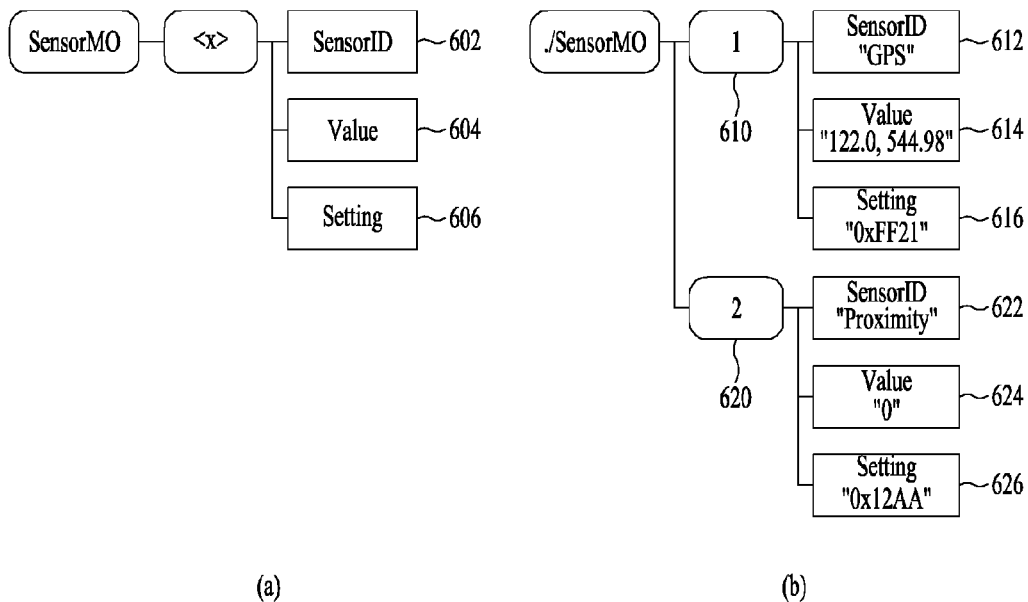
(a)  (b)
FIG. 7
```
Instance URI      = MOID "/" MIID path-from-moroot [ "?" query ]
MIID              = 1*unreserved
path-from-moroot  = "/" / 1*("/" node-name)
node-name         = 1*unreserved
```
FIG. 8
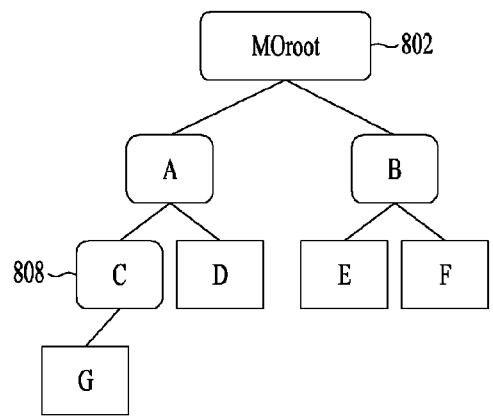

```
ClientURI        = MOID "/" mo-inst path-from-moroot [ "?" query ]
mo-inst          = MIID / ""
path-from-moroot = "/" / 1*("/" node-name)
MIID             = 1*unreserved
node-name        = 1*unreserved
```

FIG. 13

```
ClientURI        = MOID "/" mo-inst path-from-moroot [ "?" query ]
mo-inst          = MIID / x-name / ""
path-from-moroot = "/" / 1*("/" node-name)
node-name        = real-name / x-name
real-name        = 1*unreserved
x-name           = "(" ALPHA ")"
```

FIG. 14

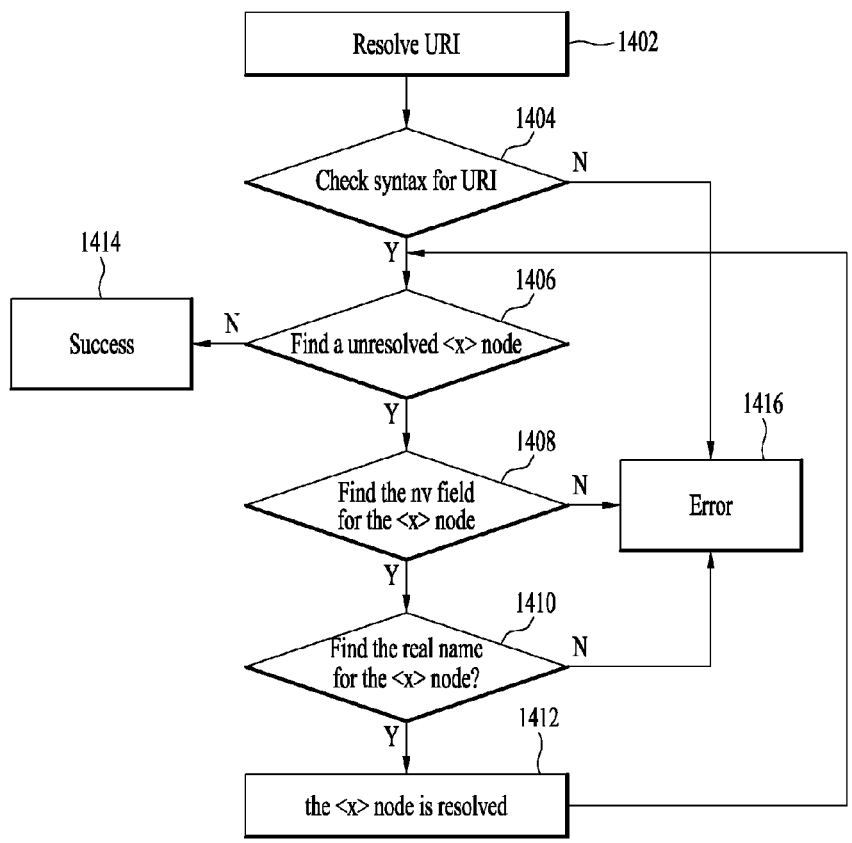

FIG. 15

```
ClientURI        = MOID "/" mo-inst path-from-moroot [ "?" query ]
mo-inst          = MIID / x-name / "" / "*"
path-from-moroot = "/" / 1*("/" node-name)
node-name        = real-name / x-name / "*"
real-name        = 1*unreserved
x-name           = "(" ALPHA ")"
```

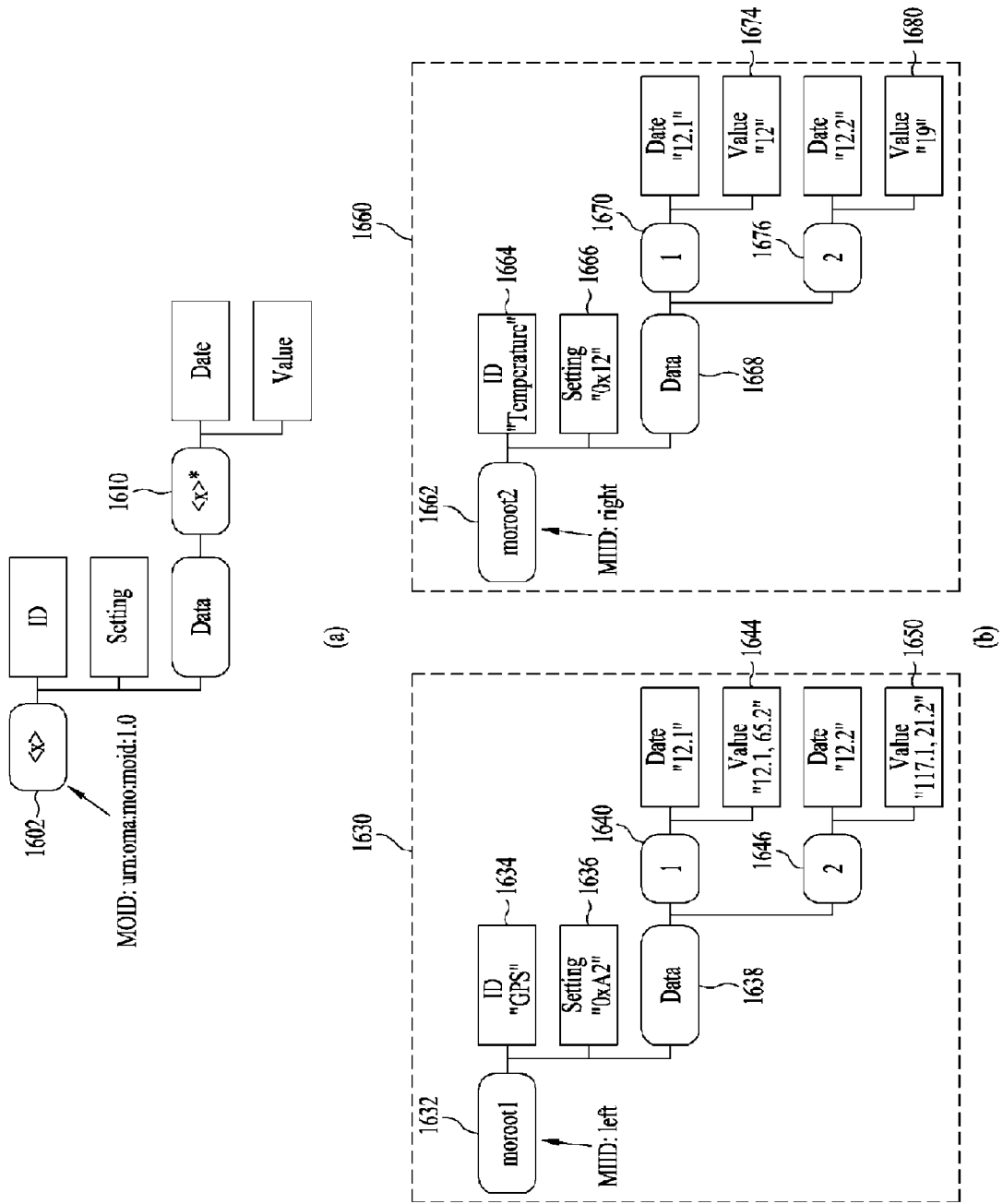

METHOD FOR ADDRESSING NODE ADDRESS FOR DEVICE MANAGEMENT AND APPARATUS THEREFOR

This application is a 35 USC § 371 National Stage entry of International Application No. PCT/KR2013/007540 filed on Aug. 22, 2013 and claims priority to U.S. Provisional Application No. 61/692,207, filed Aug. 22, 2012, U.S. Provisional Application No. 61/699,869, filed Sep. 12, 2012, U.S. Provisional Application No. 61/760,151, filed Feb. 3, 2013 U.S. Provisional application Ser. No. 16/764,534, filed Feb. 13, 2013, and 61/803,090, filed Mar. 18, 2013, all of which are incorporated by reference in their entirety herein.

TECHNICAL FIELD

The present invention relates to device management and, more particularly, to a method and device for expressing an address of a node used for device management.

BACKGROUND ART

In a current communication environment, as kinds and functions of terminals and application services thereof have exploded, it has become increasingly difficult to configure terminals and application services according to business policy, user requirements and changed network environments. Device management technology refers to technology of, at a third party, efficiently managing a device used by a user in order to solve such a problem.

Device management technology may manage application services developed by wireless application protocol (WAP), third generation partnership project (3GPP), open service gateway initiative (OSGi), telemanagement forum (TMF), etc. and open mobile alliance (OMA) device management technology has been used as technology capable of satisfying such requirements. In addition, OMA device management technology is being developed in consideration of requirements and use cases of global mobile communication markets. In particular, since OMA device management technology is not restricted by terminal kind, operating system, region or network technology, OMA device management technology may combine or replace device management technologies restricted to some existing networks and terminals.

DISCLOSURE

Technical Problem

An object of the present invention is to provide a method and device for expressing/resolving an address of a node used for device management.

Another object of the present invention is to provide a method and device for expressing/resolving an address, which is capable of efficiently designating management object instances having the same management object identifier (MOID).

Another object of the present invention is to provide a method and device for expressing/resolving an address, which is capable of efficiently designating an unnamed node included in a management object instance.

Another object of the present invention is to provide a method and device for expressing/resolving an address, which is capable of designating a plurality of addresses using one node address.

The technical problems solved by the present invention are not limited to the above technical problems and other technical problems which are not described herein will become apparent to those skilled in the art from the following description.

Technical Solution

In an aspect of the present invention, provided herein is a method of resolving a uniform resource identifier (URI) indicating a specific node for device management in a device, the method including finding at least one MO instance according to a management object identifier (MOID) and MO instance information included in the URI and finding the specific node using a path from an MO instance root node included in the URI to the specific node within the at least one MO instance, wherein, if the MO instance information includes a management object instance identifier (MIID), the finding the at least one MO instance includes finding a unique MO instance having the MOID and the MIID and returning errors if no MO instance having the MOID and the MIID is present or if a plurality of MO instances each having the MOID and the MIID are present.

In another aspect of the present invention, provided herein is a device for resolving a uniform resource identifier (URI) indicating a specific node for device management including a memory and a processor connected to the memory, wherein the processor is configured to find at least one MO instance according to a management object identifier (MOID) and MO instance information included in the URI and to find the specific node using a path from an MO instance root node included in the URI to the specific node within the at least one MO instance, wherein, if the MO instance information includes a management object instance identifier (MIID), the finding the at least one MO instance includes finding a unique MO instance having the MOID and the MIID and returning errors if no MO instance having the MOID and the MIID is present or if a plurality of MO instances each having the MOID and the MIID are present.

Preferably, if the MO instance information consists of a first delimiting character, an alphabet letter and a second delimiting character, the URI may further include at least one node value field, each of the at least one node value field may include a path from a location expressed by the MO instance information to a leaf node and a node value of the leaf node, and the finding the at least one MO instance may include finding a unique MO instance for enabling the leaf node to have the node value with respect to each of the at least node value field.

Preferably, each of the at least one node value field may include the MO instance information consisting of the first delimiting character, the alphabet letter and the second delimiting character.

Preferably, if the MO instance information consists of an empty string, the finding the at least one MO instance may include finding a unique MO instance having the MOID in the device.

Preferably, if the MO instance information consists of a wildcard character, the finding the at least one MO instance may include finding all MO instances each having the MOID in the device.

Preferably, if the path from the MO instance root node to the specific node includes a node name consisting of a first delimiting character, an alphabet letter and a second delimiting character, the URI may further include at least one node value field, each of the at least one node value field may include a path from a location indicated by the node name to a leaf node and a node value of the leaf node, and the finding the specific node may include finding a unique node for enabling the leaf node to have the node value with respect to each of the at least one node value field.

Preferably, each of the at least one node value field may include the node name consisting of the first delimiting character, the alphabet letter and the second delimiting character.

Preferably, if the path from the MO instance root node to the specific node includes a node name consisting of a wildcard character, the finding the specific node may include finding all nodes corresponding to a location of the wildcard character.

Preferably, if the path from the MO instance root node to the specific node consists of one delimiting character, the finding the specific node may include finding the MO instance root node.

Advantageous Effects

According to the present invention, it is possible to express/resolve an address of a node used for device management.

According to the present invention, it is possible to efficiently designate management object instances having the same management object identifier (MOID).

According to the present invention, it is possible to efficiently designate an unnamed node included in a management object instance.

According to the present invention, it is possible to designate a plurality of addresses using one node address.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 1 is a diagram showing a DM tree.

FIGS. 2 and 3 are diagrams showing a method of utilizing a node address.

FIG. 5 is a diagram showing a command transmitted by a DM server using a virtual uniform resource identifier (URI).

FIGS. 6(A) and 6(B) are diagrams showing an addressing scheme using a virtual URI.

FIG. 7 is a diagram showing syntax expressing an instance URI according to the present invention.

FIG. 8 is a diagram showing an MO instance.

FIG. 13 is a diagram showing syntax expressing a URI using an x-name according to the present invention.

FIG. 14 is a flowchart illustrating a method for resolving a URI using an x-name according to the present invention.

FIG. 15 is a diagram showing syntax expressing a URI according to the present invention.

FIGS. 16(A) and 16(B) are diagrams showing an MO including an <x> node and an MO instance.

BEST MODE

Figures 1, 2:
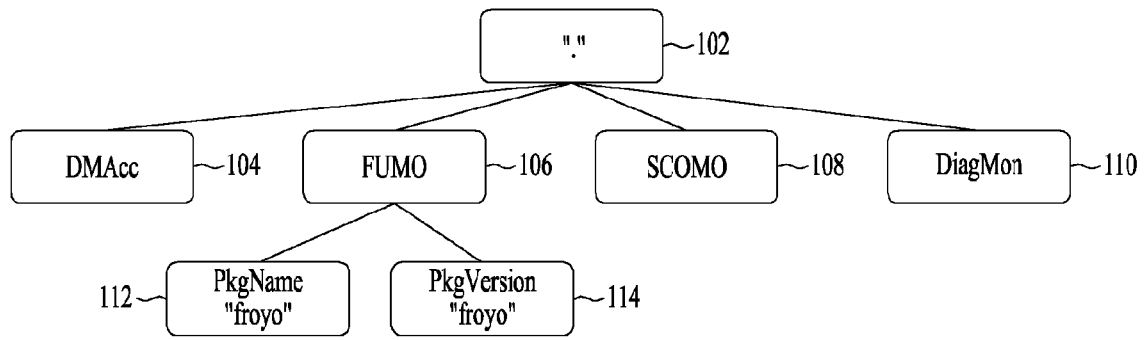

The present invention relates to device management. However, the present invention is not limited to device management but is applicable to all systems and methods to which the technical teachings of the present invention are applicable. For example, the present invention is applicable to all systems and methods having a data structure using a tree structure.

Technical terms used in this specification are used merely to illustrate specific embodiments, and it should be understood that they are not intended to limit the present invention. So long as not defined otherwise, all terms used herein including technical terms may have the same meaning as those generally understood by an ordinary person skilled in the art to which the present disclosure pertains, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to context, and should not be construed in an excessively restrictive manner.

Exemplary embodiments of the present invention will be described below in detail with reference to the accompanying drawings wherein the same reference numbers are used throughout this specification to refer to the same or like parts. In describing the present invention, a detailed description of known functions and configurations will be omitted when it may obscure the subject matter of the present invention. The accompanying drawings are used to help easily understanding the technical idea of the present invention and it should be understood that the concept of the present invention is not limited by the accompanying drawings. The concept of the present invention should be construed to extend to any alterations, equivalents and substitutions besides the accompanying drawings.

Although a specific device is shown in the drawings, the device may include a portable device having a communication function, such as a mobile phone, a personal digital assistant (PDA), a smartphone, a wireless modem or a laptop, and a non-portable device such as a personal computer (PC) or a vehicle-mounted device. In the present disclosure, the device may have the same meaning as user equipment (UE), mobile equipment (ME), mobile station (MS), user terminal (UT), subscriber station (SS), wireless device, handheld device, access terminal (AT) or terminal.

A terminal supporting device management (DM) according to the open mobile alliance (OMA) standard may have a data structure including data necessary for DM. For example, a management object (MO) may have a data structure having a tree shape. A tree structure for DM may be referred to as a management tree, a device management tree or a DM tree. The DM tree functions as an interface for communication between a DM server and a DM client. In addition, in the OMA standard, at least one MO is defined for DM and a terminal supporting DM may have at least one MO instance in order to perform a specific DM function. The MO instance in a terminal in the form of a specific data structure. For example, the MO instance may have a data structure having a tree shape and may be a subtree of the DM tree. Accordingly, among MOs supported by the terminal, an MO, in which an instance is created, may be stored in the DM tree as one subtree.

The DM tree may have at least one node expressed as a single element. Each node of the DM tree may not store data or may store at least one datum. At least one datum stored in each node may be referred to as anode value. A node located at an uppermost level in the DM tree without a parent node may be referred to as a root node. The root node may be expressed by one character ".". A node having a node value without a child node in the DM tree may be referred to as a leaf node. A node which may have a child node but may not have any node value may be referred to as an interior node. Each node of the DM tree may have a unique address expressed by a uniform resource identifier (URI).

FIG. 1 shows a DM tree of a terminal. In FIG. 1, as a non-limiting example, a terminal may support an MO such as a DM account management object (DMAcc), a firmware update management object (FUMO), a software component management object (SCOMO), a diagnostics and monitoring management object (DiagMon) or a lock and wipe management object (LAWMO). The terminal supporting a specific MO means that the terminal receives a command related to the specific MO from the DM server, processes the command according to a specific MO standard, and returns a result to the DM server.

Referring to FIG. 1, a DM tree having 3 levels is shown. In FIG. 1, a root node 102 is expressed by ".". In addition, the DM tree of FIG. 1 may include a DMAcc instance, a FUMO instance, a SCOMO instance and a DiagMon instance. In addition, the FUMO instance may include a node "PkgName" and a node "PkgVersion". Each of the node "PkgName" and the node "PkgVersion" may have a node value "froyo". In the DM tree of FIG. 1, a unique address "./FUMO/PkgName" may be used in order to address the node "PkgName". The DM server may retrieve the node value (e.g., "froyo") stored in the node from the DM client of the terminal using the unique address.

If the terminal supports a specific MO but an instance of the specific MO is not present, the instance of the MO may not be included in the DM tree. In this case, the DM server may create the instance of the MO in the DM tree using an add command and then execute a management command related to the specific MO. In the example of FIG. 1, the terminal supports a LAWMO but a LAWMO instance is not created. Since a command related to the LAWMO is targeted at the LAWMO instance, the DM server cannot send the command related to the LAWMO to the DM client of the terminal. In this case, the DM server may first create the LAWMO instance in the DM tree, transmit the command related to the LAWMO and execute a management command related to the LAWMO.

The address used in the OMA DM is expressed in the form of a URI and the following rule is applied.

URI should not end in "/". Accordingly, the URI of the root node in the DM tree should be expressed by ".", not by "./".

URI should not include "../". "./" should be used in the start of the URI only.

Table 1 below shows DM commands which may be used for a DM protocol.

TABLE 1

| Command | Description |
| --- | --- |
| HGET | The DM Server uses this command to requests the DM Client to retrieve data from the Data Repository using HTTP GET, and add or replace the received data into the device. |
| HPUT | The DM Server uses this command to request the device to send data to the Data Repository using HTTP PUT. |
| HPOST | The DM Server uses this command to request the device to send data to the Data Repository using HTTP POST. |
| DELETE | The DM Server uses this command to delete data in the device. |
| EXEC | The DM Server uses this command to execute an executable node in the device. |
| GET | The DM Server uses this command to retrieve data from the device. The DM Client sends the data within the current DM session. |
| SHOW | The DM Server uses this command to initiate a UI Session between the Web Browser Component and the Web Server Component. |
| CONT | The DM Server uses this command for the DM Client to continue the DM session with the specified DM Server URI. |
| END | This command is used by the DM Server to terminate the DM session. |
| DEFAULT | Configure the DM Client to use a specific address to capture configuration if that is missing in the device for an specific MOID |

In Table 1, HTTP indicates hypertext transfer protocol. In addition, a DM session may mean continuous connection between a DM server and a device established to perform one or more device management operations. A management object identifier (MOID) refers to an identifier for identifying an MO type defined in the OMA standard, which will be described in detail below.

FIG. 2 shows a method of utilizing a node address. More specifically, FIG. 2 shows a method for sending a node address from a DM server to a DM client along with a Get command. The Get command may have one URI as a parameter. The Get command is differently processed depending on whether the URI indicates a leaf node or an interior node. If the URI indicates a leaf node, the DM client returns a node value of the leaf node. The DM server may designate a URI via <Target>/<LocURI> and the DM client may return the value of the node via <Item>/<Data>. In the example of FIG. 2, when the DM server executes the Get command with respect to the node "./FUMO/PkgName" (112 of FIG. 1), the DM client may return the value "froyo" of the node "./FUMO/PkgName" to the DM server.

FIG. 3 shows a method of utilizing a node address. If the URI indicates an interior node, the DM client returns a list of child nodes of the interior node. In the example of FIG. 3, when the DM server executes the Get command with respect to the node "./FUMO" (106 of FIG. 1), the DM client may return "./FUMO/PkgVersion" and "./FUMO/PkgName" to the DM server.

As described above, in the DM protocol, the MO instance may be composed of subtrees of the DM tree. In this case, the subtrees of the MO instance may be configured at different locations using different names in the DM tree according to implementation. Accordingly, in the DM tree, the MO root node may not have a fixed node name and a fixed address. For example, the MO root node of the FUMO may be "./fumo" in one terminal type, "./mycompany/fumo" in another terminal type and may even be named "./scomo". Due to this property, the DM tree may be flexibly configured according to terminal type and the MO instance may not be identified using the MO root node name only from the viewpoint of the DM server. For example, if the FUMO root node has an address "./scomo", the DM server may not identify whether this node is a root node of the SCOMO or a root node of the FUMO.

In order to solve this problem, in the DM protocol, an identifier for uniquely identifying each MO type is assigned to each MO and is referred to as a management object identifier (MOID). For example, the MOID may have a uniform resource name (URN) form. The MOID corresponds to all MO instances created by the terminal and may be used to identify the MO type of the MO instance. For example, in the DM protocol, the MOID of FUMO 1.0 may be "urn:oma:mo:oma-fumo:1.0" and the MOID of SCOMO 1.0 may be "urn:oma:mo:oma-scomo:1.0". The MOID may be stored in a type attribute of the root node of each MO instance. Accordingly, the node is a FUMO root node if the type attribute value of the node has the MOID of the FUMO and is a SCOMO root node if the type attribute value of the node has the MOID of the SCOMO. In OMA DM, the MO may be described using a device description file (DDF). In the DDF describing the management function of the terminal, the MOID may be assigned to the MO root node using a <DFProperties>/<DFType> element. Accordingly, the node having the MOID may be determined as the root node of the MO via the <DFProperties>/<DFType> element of the DDF and the type attribute of the DM tree. Accordingly, in order to determine whether one node is a root node of an MO, the name and address of the node are not used but the MOID assigned to the node is used.

The DM protocol (e.g., DM 1.3) supports three addressing schemes in order to indicate a specific node in the DM tree. For example, such addressing schemes may be generally expressed in the form of a URI. The DM server may send information about a node, at which a command is targeted, via a URI when sending a specific command to the DM client. For example, when the DM server sends a command "Get" and a URI "./a/b/c" to the DM client, the DM client returns the information about the node indicated by the URI "./a/b/c" to the DM server.

Absolute URI Addressing Scheme

An absolute URI is an addressing scheme for expressing a node starting from a root node of a DM tree. Since the absolute URI including the root node of the DM tree is described, the absolute URI begins with "." indicating the root node of the DM tree. For example, in the example of FIG. 1, if the node 112 is expressed by the absolute URI, the node may be expressed by "./FUMO/PkgName".

Since the absolute URI expresses the address of the node starting from the root node of the DM tree, it is possible to easily confirm the node expressed by the absolute URI in the DM tree. However, since the MO instance may be configured at a different location in the DM tree according to implementation, the absolute URI of the MO instance may be changed according to terminal type or terminal. For example, the DM server generally sends an EXEC command to an "Update" node of the FUMO in order to execute a DM command "firmware update". For this, a URI indicating the "Update" node of the FUMO may be sent to the terminal along with the EXEC command. However, if this URI is expressed by the absolute URI, since the URI may be changed according to terminal, the DM server should differently configure the URI for firmware update depending on how the UE configures the FUMO instance.

Such a problem occurs because the root node location of the MO instance may be differently set according to terminal. In most MOs such as a FUMO, a SCOMO, etc., the root node location of the MO instance is not fixed in the DM tree for each terminal. In case of such an MO, an MO instance root node is expressed by an unnamed node or an <x> node and the name of the node may not be described in the DDF. In case of such an MO, when an MO instance is created in the DM tree, the location of the MO instance (the location of the MO instance root node) may be freely determined. Accordingly, although it is possible to flexibly configure the DM tree composed of MOs in consideration of the properties of the terminal, the absolute URI to which the command will be sent should first be ascertained before the DM server sends the DM command.

Relative URI Addressing Scheme

A relative URI is an addressing scheme for expressing a relative address of a root node of a DM tree. The relative URI does not begin with "." and indicates the relative address of the root node of the DM tree. For example, in the example of FIG. 1, if the node 112 is expressed by the relative URI, the node may be expressed by "FUMO/PkgName". While the absolute URI includes the root node of the DM tree, the relative URI does not include the root node of the DM tree. For example, if "./" indicating the root node is deleted from the absolute URI, the relative URI is obtained. Accordingly, the relative URI has the same problem as the absolute URI.

Virtual URI Addressing Scheme

The absolute URI and the relative URI are advantageous in that the addressing form is simple. However, as described above, even in the same MO, the storage location of the MO instance in the DM tree may be changed according to terminal. Accordingly, even in the same MO, the absolute URI or the relative URI is changed according to terminal. In contrast, the virtual URI expresses the address of the node using the MOID. Since the MOID indicates the root node of the MO instance, even when the storage location of the MO instance in the DM tree is changed according to terminal, the root node of the MO instance can be found using the MOID. The virtual URI indicates the node in the DM tree using two URIs.

URI A: Indicates a specific MO instance. URI A indicates an MO root node of a specific MO instance.

URI B: Indicates a relative URI of the MO root node of the MO indicated by URI A.

In order to ascertain the node indicated by the virtual URI, the DM client may transform a virtual URI into an absolute URI. For example, URI A may be transformed into the absolute URI and then URI B may be postfixed to URI A, thereby transforming the virtual URI into the absolute URIy. However, in the transformation process, if there is a plurality of MO instances having the same MOID, the virtual URI may be transformed into a plurality of absolute URIs, causing a problem. For example, in case of a device capability management object (DCMO), there may be a DCMO instance for managing a camera and a DCMO instance for managing a universal serial bus (USB). However, these two DCMO instances may have the same MOID. Accordingly, these two DCMO instances have the same URI A and, in some cases, may also have the same URI B.

In order to solve such a problem, the DM server may transform the virtual URI into a unique absolute URI using a node value. This is possible because MO instances having the same MOID have different node values. If the virtual URI is not transformed into a unique absolute URI, the DM client may send an error code "Not Found" to the DM server without processing the DM command for the virtual URI.

URI A fundamentally indicates an MO instance based on an MOID and is expressed in the form of "<URI>?MOID=<m-value>&<attribute>=<a-value>", for example. Elements configuring URI A will now be described.

<URI>: This element may specify a location for searching for an MO instance in order to enable the DM client to transform URI A into the absolute URI. For example, if <URI> has a value "./mycompany", the DM client searches the node "./mycompany" and subtrees thereof for an MO instance. For example, if <URI> has a value ".", the DM client searches the DM tree for an MO instance.

MOD=<m-value>: This element indicates an MO instance indicated by URI A using an MOID. The MOID value may be described in <m-value>. For example, if a FUMO instance is indicated, <m-value> may have "urn:oma:mo:oma-scomo:1.0".

attribute>=<a-value>: This element may be used when the DM server further restricts an MO instance using a node value. For example, this element may be used when several MO instances having the same MOID are present. <attribute> indicates a relative address of an MO root node in the form of a URI and <a-value> indicates a node value of a node indicated by <attribute>. Accordingly, even when several MO instances having the same MOID are present, URI A indicates only an MO instance having a value corresponding to <a-value> in the node indicated by <attribute>. The DM server may specify a plurality of "<attribute>=<a-value>" using an operator such as "&". In this case, URI A indicates only an MO instance satisfying a plurality of "<attribute>=<a-value>".

URI B indicates a relative URI for an MO root node and begins with [x]. Here, since [x] indicates an MO root node, a URI following [x] indicates a relative node address of the MO root node.

URI A of the virtual URI is designated via a <TargetParent>/<LocURI> element and URI B is designated via <Target>/<LocURI>. In a Delete command, when an entire MO instance is to be deleted, URI B may not be designated.

Figure 4:
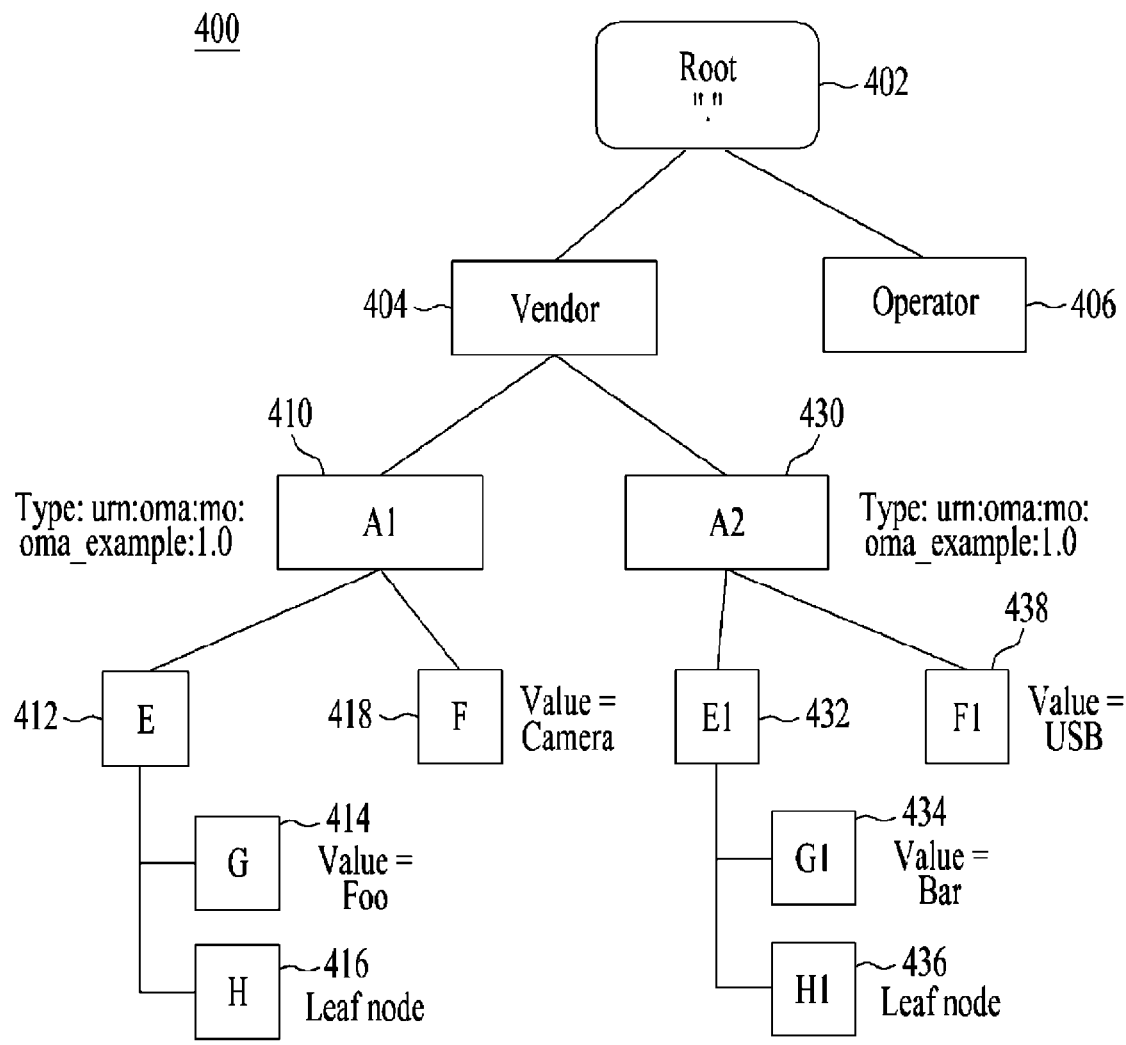
FIG. 4 is a diagram showing an example of a DM tree which may be configured in a specific terminal.

FIG. 4 is a diagram showing an example of a DM tree which may be configured in a specific terminal. In the example of FIG. 4, a root node of a DM tree 400 is denoted by 402 and the DM tree 400 includes two MO instances A1 410 and A2 430. The MO instances A1 410 and A2 430 have the same MOID "urn:oma:mo:OMA_example:1.0".

Referring to FIG. 4, the DM server may use one of the three addressing schemes described above in order to transmit a command for a node 416. For example, if an absolute URI addressing scheme is used, the node 416 may be expressed by "./Vendor/A1/E/H". In addition, if a relative URI addressing scheme is used, the node 416 may be expressed by "Vendor/A1/E/H". However, as described above, the location of the MO instance may be changed depending on how the DM tree is managed/implemented in the terminal. Since the DM server cannot know DM tree configuration methods of all terminals, a problem may occur.

In addition, for example, if a virtual URI addressing scheme is used, the node 416 may be expressed by URI A and URI B. For example, since URI A may be expressed in the form of "<URI>?MOID=<m-value>&<attribute>=<a-value>", URI A for the node 416 may be expressed by "./Vendor?MOID=urn:oma:mo:oma_example:1.0&F=Camera&G=Foo". In this example, a <URI> element of URI A has "./Vendor". Accordingly, a DM client of the terminal may search for an MO instance located at a node 404 indicated by "./Vendor" and subtrees thereof. In addition, the MOID=<m-value> element of URI A has a value "MOID=urn:oma:mo:oma_example:1.0". Since the <URI> of URI A is "./Vendor", the DM client searches "./Vendor" and subtrees thereof to find an MO instance having a specific MOID. Accordingly, the MOID is "urn:oma:mo:oma_example:1.0". As the MO instance having such an MOID under the subtree "./Vendor", two MO instances A1 410 and A2 A430 are present and located at "./Vendor/A1" and "./Vendor/A2". Accordingly, in the example of FIG. 4, since the two MO instances A1 410 and A2 430 have the same MOID, a unique MO instance may not be designated by the MOID. In this case, an <attribute>=<a-value> element may be used and, in this example, an <attribute>=<a-value> element of URI A has a value "F=Camera&E/G=Foo". By this element, the MO instance A1 410, in which the value of an F node 418 under the MO instance root node has a value of Camera and the value of an E/G node 414 under the MO instance root node has a value of Foo, may be designated.

Since the DM server uniquely designates the MO instance including the node 416 using URI A, the relative address for the MO instance root node may be indicated using URI B. For example, URI B of the virtual URI for the node 416 may be expressed by "[x]/E/H". [x] indicates the root node of the MO instance.

FIG. 5 is a diagram showing a command for the node (416 of FIG. 4) transmitted by a DM server using a virtual uniform resource identifier (URI).

As described above, since URI A of the virtual URI is designated via a <TargetParent>/<LocURI> element, in FIG. 5, URI A of the virtual URI for the node (416 of FIG. 4) may be expressed by "./Vendor?MOID=urn:oma:mo:oma_example:1.0&F=camera&E/G=Foo". In addition, since URI B of the virtual URI is designated via <Target>/<LocURI> element, in FIG. 5, URI B of the virtual URI for the node (416 of FIG. 4) is "[x]/E/H". Accordingly, the DM client, which has received this command, transforms URI A into an absolute URI "./Vendor/A1", removes [x] from URI B "[x]/E/H", and postfix "/E/H" to the absolute URI for URI A to obtain "./Vendor/A1/E/H". Then, the DM client may find the node (416 of FIG. 4) using the transformed absolute URI and execute the command with respect to the node (416 of FIG. 4).

Although the virtual URI serves to improve the problem of the absolute URI, URI conflict may occur in the virtual URI. URI conflict means that the virtual URI is not transformed into a unique absolute URI but is resolved into a plurality of absolute URIs. If the virtual URI may be resolved into a plurality of absolute URIs, the node, at which the DM command is targeted, becomes ambiguous and thus the DM command may not be executed. In this case, the DM server should use the absolute URI.

For example, in a scenario in which a plurality of DM servers manages one terminal, the virtual URI may not be changed to a unique absolute URI. For example, assume that a DM server 1 creates and manages a DCMO instance in order to manage a camera device in a terminal. At this time, if a DM server 2 manages the same camera device in the same terminal, the DM server 2 may create a new DCMO instance and manage the camera device using the new DCMO instance. Accordingly, the terminal has two different DCMO instances for performing the same function. In this case, the DCMO instance created by the DM server 1 and the DCMO instance created by the DM server 2 may have the same MOID and the same property name (stored in <x>/Property). Accordingly, if the DM server 2 creates the new DCMO instance, both the DM server 1 and the DM server 2 may not use the virtual URI. In this case, the two DCMO instance may not be distinguished using the virtual URI.

Since the <URI> element of the virtual URI is described using the absolute URI, the DM server should know the overall structure of the DM tree. If the DM server should know all DM tree structures which differ between terminals, overload may occur.

Problems of Addressing Scheme for Node Under Unnamed Node

In an MO, a specific node may be expressed by an unnamed node. The unnamed node serves as a placeholder and a real node name of the unnamed node may be determined at runtime. In the MO, the name of the unnamed node may include "<" and ">" and a lowercase character therebetween. For example, the unnamed node may be expressed by "<x>". For convenience, the unnamed node may be referred to as an <x> node.

Since a real node name of the <x> is determined at runtime, the DM server cannot know the real node name in advance. Accordingly, if the DM server sends a DM command to a specific node under the <x> node, the DM server first retrieves MO instance information via a GET command and then ascertains a real node name of the <x> node. Since the DM server cannot request necessary information only, efficiency deteriorates.

FIG. 6 is a diagram showing an addressing scheme for an <x> node. In FIG. 6, as a non-limiting example, a SensorMO for sensor management will be focused upon. A SensorMO is an MO for enabling a DM server to read a sensor value and to change settings. FIG. 6(a) shows a sensor management object (SensorMO) defined in the standard and FIG. 6(b) shows a SensorMO instance created by a terminal using an MO. The SensorMO instance may be located under a DM tree root node or at another location.

Referring to FIG. 6(a), in the SensorMO, a "SensorMO/<x>/SensorID" node 602 has a unique identifier assigned to each sensor and is used to identify each sensor. For example, the node value of the "SensorMO/<x>/SensorID" node 602 may be set to "GPS" in the case of a GPS sensor, may be set to "Proximity" in the case of a proximity sensor, and may be set to "Accelerometer" in the case of an acceleration sensor. A "SensorMO/<x>/Value 604 indicates a value of a sensor and the DM server may send a GET command to the node 604 and read a current value of the sensor. The DM server may read a sensor setting value from a "SensorMO/<x>/Setting" node 606 and set the sensor setting value as a new value.

Referring to FIG. 6(b), two SensorMO instances are created in a DM tree using the SensorMO of FIG. 6(a). A first SensorMO is an MO for a GPS sensor and the name of the <x> node 610 may be set to 1 upon creating an MO instance. A second SensorMO is an MO for a proximity sensor and the name of the <x> node 620 may be set to 2 upon creating an MO instance. If the DM server changes proximity sensor settings and the DM server knows that information about the proximity sensor is present in a subtree of a "./SensorMO/2", the DM server may immediately send a node value change command to a "./SensorMO/2/Setting" node 626 to change setting information. In this case, only one DM command may be necessary.

However, since the name of the <x> node is determined at runtime, if the DM server does not previously retrieve this information, the name of the <x> node cannot be ascertained. In addition, even when the name of the <x> node is got, the name of the <x> node may differ between terminals. Therefore, it may be difficult for the DM server to manage the names of the <x> nodes of all terminals. Accordingly, the DM server uses the following method in order to change the proximity sensor setting value.

Step 1: The DM server transmits a GET command for an MO root node of a SensorMO and retrieves information about a SensorMO instance.

Step 2: The DM server finds an address to be used to change setting information of a proximity sensor via SensorMO instance information. In the example of FIG. 6, the DM server finds that an unnamed node corresponding to the <x> node in a SensorMO is "2" in the case of the proximity sensor. In the example of FIG. 6, if it is assumed that an absolute URI is used and a SensorMO is located at a DM tree root, the DM server may use a URI "./SensorMO/2/Setting".

Step 3: The DM server transmits, to the terminal, a DM command for changing a node value to a new value with respect to the URI "./SensorMO/2/Setting" found in step 2.

Accordingly, in the case of the unnamed node, since the DM server does not know that proximity sensor related information is stored under a subtree "./SensorMO/2", the DM server cannot send a GET command to "./SensorMO/2/Value". Accordingly, the GET command should be sent to all subtrees of "./SensorMO". Accordingly, since only information necessary for the unnamed node cannot be requested, efficiency deteriorates.

Problems of Addressing Scheme for Plural Nodes

In an existing DM protocol (e.g., DM 1.3), a method of indicating a plurality of nodes using one URI was not present. Absence of this method is combined with the <x> node, causing a problem. For example, in the case of a SCOMO for software management, a package ID of software installed in a terminal may be stored at an "<x>/Inventory/Deployed/<x>/PkgID" node. However, since the <x> node is present in front of the PkgID node, if the real names of the <x> node for all installed software are not known, the DM server cannot send a Get command to each PkgID node. Accordingly, in order to enable the DM server to retrieve all the package IDs of the software installed in the terminal, the DM server should send a Get command to a "<./scomo/Inventory/Deployed" node. When the Get command is sent to the "[x]/Inventory/Deployed" node, since data included in all subtrees under the "deployed" node is transmitted to the DM server, more data than necessary is transmitted and thus efficiency deteriorates. Accordingly, there is a need for an addressing scheme indicating all specific nodes under the <x> node.

Therefore, the present invention proposes a new addressing scheme for solving the problems of the above-described addressing methods. More specifically, the present invention proposes a method for, at a DM server, designating a node without knowing the structure of a DM tree of a terminal. More specifically, the present invention proposes an addressing scheme based on an MOID and an MO instance identifier (MIID) (hereinafter, an instance URI), a method of indicating a node under an <x> node without knowing a real node name of an unnamed node (or the <x> node) (hereinafter, a URI using an x-name) and a method of indicating a plurality of nodes using a single URI (hereinafter, a URI using a wildcard). The DM server may designate a specific node or a set of nodes of an MO instance using the addressing scheme according to the present invention and send a management command (or a DM command) targeted at the designated node.

Hereinafter, the addressing scheme according to the present invention may be expressed by syntax according to a certain standard. For example, the certain standard includes request for comments (RFC) 3986. The following syntax uses the same syntax as RFC 3986 and "1*" means that an expression following * may be designated once or more. "1*reserved" means that a reserved value may be designated once or more. The reserved value means a value distinguished from other data in the URI, such as a delimiting character such as ":", "/", "?", "$", "(", ")", for example. In contrast, an unreserved value means a value excluding the value reserved for a specific purpose. For example, 1*("/" node-name) means that "/" and node-name may be sequentially repeated once or more. Node-name indicates the name of the node and the name of the unnamed node may be expressed by <x>.

Instance URI

An instance URI is an addressing scheme using an MO instance identifier. In the instance URI, an MO instance identifier may be referred to as an MIID. The MIID is assigned to all MO instances and is used as an identifier for uniquely identifying an MO instance between MO instances having the same MOID. Accordingly, an MO instance of a terminal cannot be uniquely identified using an MIID only and all MO instances of a terminal can be uniquely identified using a pair of MOID and MIID. The MIID need not be assigned in consideration of other terminals or servers but may be uniquely assigned among MO instances having the same MOID in the terminal. Accordingly, the same MIID may be assigned to MO instances having different MOIDs. The MIID may be assigned to the MO instance by the DM client when the DM client creates the MO instance. Upon MIID assignment, the following rules are applicable.

The MIID uniquely identifies each MO instance among MO instances having the same MOID. The pair of MOID and MIID uniquely identifies each MO instance in the terminal. The MIID may not be unique between MO instances having different MOIDs.

The MIID is not changed until the MO instance is deleted.

The MIID of the deleted MO instance should not be reused for another MO instance having the same MOID during a predetermined period. This is because, if the MIID of the deleted MO instance is used for another MO instance having the same MOID, the DM server may unintentionally designate another MO instance.

The addressing scheme using the MOID and the MIID may be referred to as an instance URI. The instance URI may be expressed using an augmented Backus-Naur form (ABNF).

FIG. 7 is a diagram showing syntax expressing an instance URI according to the present invention. The instance URI is not limited to an expression according to the syntax of FIG. 7 and may be expressed in another form within the scope of the present invention.

Referring to FIG. 7, in the instance URI, an MOID and an MIID uniquely designate a specific MO instance. A path-from-moroot component designates the address of a specific node in the designated MO instance. The path-from-moroot component may have a form of "/" or 1* ("/" node-name). If the path-from-moroot component is "/", an MO instance root node is designated. If the path-from-moroot component is 1* ("/" node-name), the path-from-moroot component designates a node excluding the MO instance root node in the MO instance designated by the MOID and the MIID and indicates a relative path starting from a child node of the MO instance root node. The path-from-moroot component may be referred to as a path-from-moroot.

FIG. 8 is a diagram showing an MO instance. In the example of FIG. 8, assume that the MO instance has an MOID "urn:oma:mo:oma-ex:1.0", the MIDD is "1234", and the MO instance root node is an "MOroot" node 802. Each node of FIG. 8 may be expressed as follows using the instance URI. The instance URI according to the present invention is not limited to the example of FIG. 8.

The instance URI "urn:oma:mo:oma-ex:1.0/1234/" means that the path-from-moroot component is "/". Accordingly, the instance URI "urn:oma:mo:oma-ex:1.0/1234/" designates the root node 802 of the MO instance.

The instance URI "urn:oma:mo:oma-ex:1.0/1234/A/C" means that the path-from-moroot component is "/A/C". Accordingly, the instance URI "urn:oma:mo:oma-ex:1.0/1234/A/C" designates a node 808 having a path "/A/C" from the root node 802 of the MO instance. In the example of FIG. 8, a node having an address of "MOroot/A/C" is designated.

The instance URI "urn:oma:mo:oma-ex:1.0/1234/A/C/H" designates a new node which is not present in the MO instance of FIG. 8. The DM server may create a new node using the instance URI.

Figure 9:
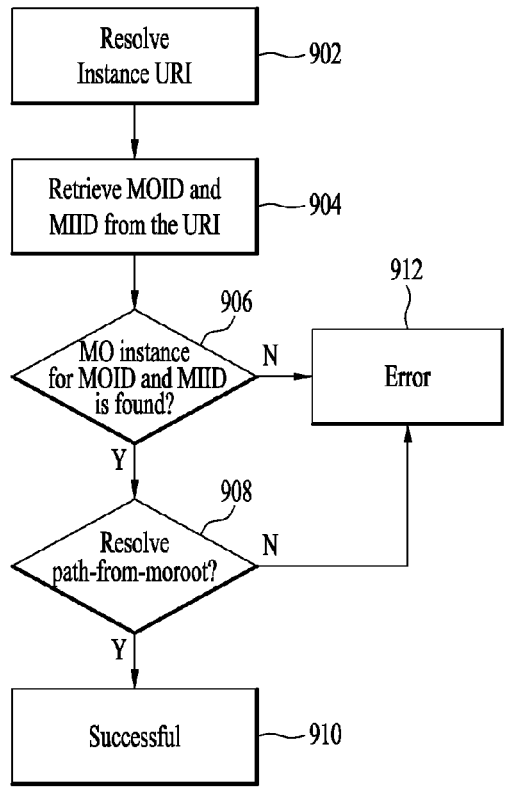
FIG. 9 is a flowchart illustrating a method for resolving an instance URI according to the present invention.

FIG. 9 is a flowchart illustrating a method for resolving an instance URI according to the present invention. According to the present invention, the DM client can ascertain a node designated by an instance URI without transforming the instance URI into another URI such as an absolute URI.

Referring to FIG. 9, in step 902, the DM client resolves the instance URI. The instance URI may be received from the DM server along with a DM command or the instance URI may be resolved with respect to a DM command autonomously created by the DM client.

In step 904, an MOID component and an MIID component are retrieved from the instance URI. Since the instance URI is prepared according to predetermined syntax, the DM client may easily retrieve the MOID component and the MIID component.

In step 906, the DM client finds an MO instance including the MOID and the MIID retrieved in step 904 among MO instances present in a terminal. Since the pair of MOID and MIID is unique to each terminal, the MO instance found in step 906 is unique and a plurality of MO instances cannot be found. If the MO instance is found, the method progresses to step 908 and, otherwise, the method progresses to step 912.

If the MO instance is found in step 906, a path-from-moroot component is resolved in step 908. Whether the path-from-moroot component is valid is checked. For example, whether the path-from-moroot component is correct for syntax is checked. If the path-from-moroot component is valid, the method progresses to step 910 and, otherwise, the method progresses to step 912.

In step 910, the DM client successfully finds the node designated by the instance URI. The DM client may execute a DM command for the node if present. At this time, whether the DM server for sending the DM command has rights is another matter.

In step 912, since the instance URI is not valid or correct, the DM client fails to find the node specified by the instance URI. If the DM server sends the instance URI, the DM client transmits an error code to the DM server.

Figure 10:
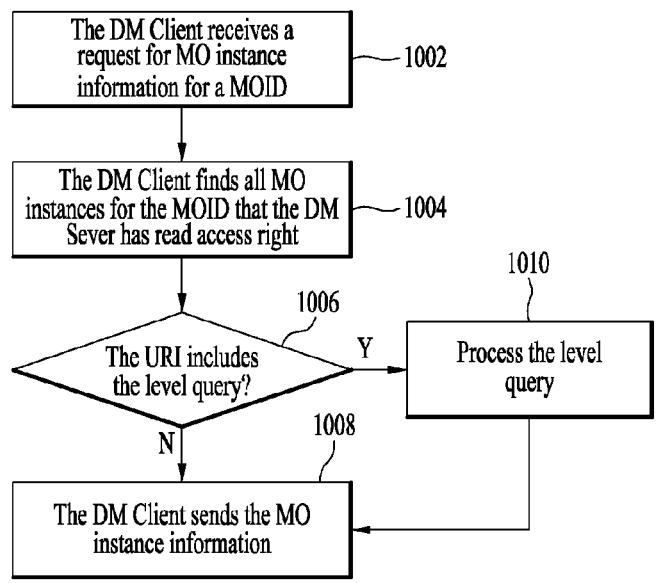
FIG. 10 is a flowchart illustrating a method for retrieving an MIID according to the present invention.

FIG. 10 is a flowchart illustrating a method for retrieving an MIID according to the present invention. As described above, the MMID may be assigned when the DM client creates the MO instance. The DM server may search for the MIID assigned to the MO instance in order to use the instance URI.

In step 1002, the DM client receives a request for MO instance information corresponding to an MOID from the DM server. This request may be expressed in the form of a GET URI, GET indicates a DM command and a URI indicates an MO instance having an MOID which is a target of the GET command.

In step 1004, the DM client finds an MO instance having an MOID among all MO instance present in the DM tree of the terminal. In this case, the DM client may find the MO instance having access rights, which may be read by the DM server, among MO instances each having an MOID.

In step 1006, the DM client checks whether the URI received in step 1002 has a level field in a query component. If the URI includes the level field in the query component, the method progresses to step 1010 and, otherwise, the method progresses to step 1008.

In step 1008, the DM client sends the MO instance information found in step 1004 to the DM server. The MO instance information includes an MIID.

In step 1010, the level field is processed if the URI transmitted by the DM server in step 1002 includes the level field. The level field will be described in detail below. After processing the level field, the DM client progresses to step 1008.

MOID URI

An MOID URI is an extension of an instance URI. As described above, the MOID is an identifier uniquely assigned to each MO and may be used to identify an MO type in the DM tree. However, since a plurality of MO instances may be created with respect to the same MO, a plurality of MO instances having the same MOID may be present. In this case, the DM server or the DM client may not uniquely identify the MO instance. However, if only one MO instance is present with respect to one MO type (e.g., only one FUMO instance is present in a terminal), the MOID may uniquely designate an MO instance in the terminal. An addressing scheme using an MOID only when only one MO instance is present in a terminal is referred to as an MOID URI. The MOID URI may be expressed by an extension of the syntax of an instance URI. In the present invention, the instance URI and the MOID URI may be referred to as a client URI (or ClientURI).

Figures 11, 12:
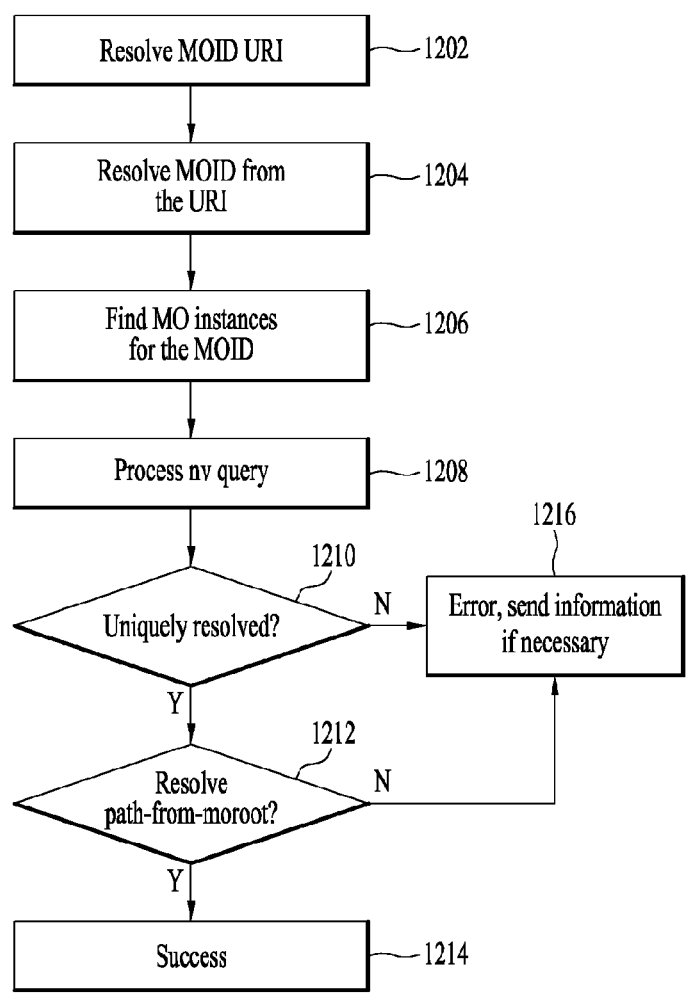
FIG. 11 is a diagram showing syntax expressing an instance URI and an MOID URI according to the present invention.
FIG. 12 is a flowchart illustrating a method for resolving an MOID URI according to the present invention.

FIG. 11 is a diagram showing syntax expressing an instance URI and an MOID URI according to the present invention. FIG. 11 shows an extension of the syntax of the instance URI, which is applicable to both the instance URI and the MOID URI. The instance URI and the MOID URI are not limited to an expression according to the syntax of FIG. 11 and may be expressed in another form within the scope of the present invention. In FIG. 11, the instance URI and the MOID URI may be referred to as a client URI.

Referring to FIG. 11, when the MIID is used for an mo-inst component, the MIID may be equal to the instance URI. Since the MOID URI is used only when only one MO instance having the same MOID is present in one terminal, an identifier for identifying the MO instance may not be necessary. Accordingly, in the syntax for the MOID URI, an mo-inst component may be designated as an empty string " ". Accordingly, if the MOID URI is used, the MOID is followed by "/" and is followed by a path-from-moroot component in the URI. In FIG. 11, similarly to FIG. 7, the path-from-moroot component may have a form of "/" or 9*("/" node-name). Accordingly, in the case of the MOID URI, the MOID may be followed by "//" without the MIID. In contrast, in the case of the instance URI, since the MOID is followed by the MIID, the MOID URI and the instance URI may be easily identified. In the URI syntax of FIG. 11, the URI may be an instance URI if the MIID is included in the mo-inst component and may be an MOID URI if " " is included. The MOID URI may designate the MO instance using the MOID component if only one MO instance having the same MOID is present in the terminal.

In FIG. 11, the path-from-moroot component indicates the path from the MO instance root node in the MO instance, similarly to the instance URI. Accordingly, the path-from-moroot component designates a specific node in the MO instance.

FIG. 12 is a flowchart illustrating a method for resolving an MOID URI at a DM client according to the present invention. The DM client may ascertain a node indicated by the MOID URI without changing the MOID URI to another URI such as an absolute URI.

In step 1202, the DM client resolves the MOID URI and finds a node indicated by the MOID URI. This step is performed because the MOID URI is sent by a DM server along with a DM command or in order to process a DM command autonomously created by the DM client.

In step 1204, the DM client retrieves an MOID component from the URI. Since the MOID URI is described according to the predetermined syntax, the DM client may easily find the MOID component.

In step 1206, the DM client finds an MO instance corresponding to the MOID retrieved in step 1204 among all MO instances included in the terminal. At this time, the scope for finding the MO instances may include all MO instances included in the terminal or may be restricted to some MO instances.

In step 1208, the DM client processes an nv field if the nv field is present in the MOID URI for the MO instance found in step 1206. Only the MO instance satisfying the nv field among the MO instances is delivered to step 1210. The nv field will be described in detail below.

In step 1210, whether the number of MO instances found in step 1208 is one is checked. If two or more MO instances are found or no MO instance is found, the method progresses to step 1216. If only one MO instance is found, the method progresses to step 1212.

In step 1212, a path-from-moroot component is resolved. Whether the path-from-moroot component is valid according to the predetermined syntax is determined. If the path-from-moroot component is valid, the method progresses to step 1214 and, otherwise, the method progresses to step 1216.

In step 1214, the node indicated by the MOID URI is successfully found. The DM client may execute a DM command targeted at the node, if present. At this time, if the DM server sends the DM command, whether the DM server has rights is a separate matter.

In step 1216, the MOID URI is incorrect. If the DM server sends the MOID URI, the DM client transmits an error code to the DM server. At this time, the DM client may transmit additional information to the DM server.

The method of resolving the MOID URI shown in FIG. 12 may be changed within the scope of the present invention. For example, the order of step 1206 and step 1208 may be inverted.

URI Using x-Name

Several MOs may have <x> node (or unnamed node) under the MO root node. As described above, the real name of the <x> node (or the unnamed node) is determined at runtime. For example, the <x> node may be used to define the structure of a subtree without predefining the names of some of a plurality of interior nodes when defining the MO. Accordingly, several <x> nodes having different node names may be generated at runtime.

As described above, since the real node name of the <x> node is determined at runtime, the DM server may not know the real node name of the <x> node in advance. Accordingly, the DM server first retrieves MO instance information via the GET command then ascertains the real node name of the <x> node. Accordingly, since the DM server cannot request necessary information only, efficiency may deteriorate. In order to solve such a problem, the present invention proposes a method for designating a node using the <x> node in the URI.

FIG. 13 is a diagram showing syntax expressing a URI using an x-name according to the present invention. FIG. 13 is an extension of the syntax of a client URI (or ClientURI), which includes an application example of an instance URI and an MOID URI. The client URI (or ClientURI) may include a URI using the <x> node according to the present invention in addition to the instance URI and the MOID URI. The client URI (or ClientURI) is not limited to an expression according to the syntax of FIG. 13 and may be changed within the scope of the present invention.

Referring to FIG. 13, an mo-inst component may include one of an MIID, an empty string " " and an x-name component. If the MIID is used for the mo-inst component, the client URI may be equal to an instance URI. If the empty string " " is used for the mo-inst component, the client URI may be equal to an MOID URI. In addition, in the client URI (or ClientURI), the x-name component may be used for the mo-inst component. The x-name component may be composed of three characters. For example, according to RFC 3986 defining the URI, the x-name component may be composed of delimiting characters "(" and ")" and an ALPHA component. The ALPHA component includes one alphabet letter and may be designated to a unique value among x-name components in one client URI. Accordingly, even when a plurality of x-name components is included in one URI, the x-name components may be uniquely identified by the ALPHA component. For example, if x-name components are included in order to designate two unnamed nodes <x> and <y> in one URI, the x-name components are designated as "(x)" and "(y)". According to RFC 3986, although "<" or ">" is recommended not to be used for the x-name component, instead of "(" and ")", "<" and ">" may be used in another example.

Even in FIG. 13, similarly to FIG. 7 or FIG. 11, the path-from-moroot component may have a form of "/" or 1*("/" node-name). However, unlike the example of FIG. 7 or FIG. 11, the node-name component may have an x-name component in addition to a real-name component composed of general characters. Accordingly, the x-name component may be used to designate an MO instance and to designate a specific unnamed node in the MO instance.

The x-name component may have the following properties.

The <x> node may not be used for a named node. The named node refers to a node, the node name of which is predetermined via definition of the MO. The named node is designated using a real node name and the unnamed node may be designated using one of a real name or an <x> node.

If the <x> node is used, the URI should include an nv field. The nv field will be described in detail below.

In the URI, if the x-name is used in order to designate the <x> node, since a unique node indicated by the URI cannot be ascertained, the URI may include additional information. For example, the URI may include a query component. The query component may provide additional information about the x-name component if the URI is expressed using the <x> node. For example, the query component in the URI may be distinguished from the path-from-moroot component by a delimiting character "?". Accordingly, the query component starts after the delimiting character "?" and ends by the end of the URI. The delimiting character "?" is not included in the query component. The query component may be configured as a sequence of a plurality of "field=value" and the plurality of "field=value" forms may be distinguished by a delimiting character "&".

Table 2 below shows fields which may be included in the query component. As shown in Table 2, the query component may include a level field, a node-value field and a cache validator field. Table 2 is merely exemplary and the query component may include some of the fields included in Table 2 or may include additional fields.

TABLE 2

| Fields | Format | Description |
| --- | --- | --- |
| level | lv=<n> | <n> represents a positive integer. If this field is specified, the client MUST only include n sublevels of child nodes; otherwise, all child nodes will be included. |
| node-value | nv=<path>:<val> | This field can be used to resolve the x-name component. <path> MUST begin with "("ALPHA ")" where the ALPHA component indicates the corresponding x-name component in the ClientURI. Starting from the corresponding x-name component, <path> indicates the relative path to the leaf node. Multiple nv fields can be specified for the same ALPHA component. <val> MUST specify the value for the leaf node specified by the <path>. The nv field can be said to be "satisfied" if the node specified by the <path> has the value specified by the <val>. |
| cache validator | cv=<val> | <val> indicates the cache validator for the node represented by the ClientURI. |

In Table 2, the level field has a form "lv=<n>" and n represents a positive integer. If the URI includes a level field, the URI may be targeted at child nodes of n sublevels. If the URI does not include a level field, the URI may be targeted at all child nodes. In Table 2, a cache validator field has a form of "cv=<val>" and provides freshness information to a node indicated by the URL.

As shown in Table 2, the query component may include a node-value field according to RFC 3986. The node-value field may be referred to as an nv field. The nv field may have a form of "nv=<path>:<val>". Here, <path> begins with a specific x-name component used for the URI to indicate a relative address. <path> may begin with "(" ALPHA ")" as in "(x)". Here, the ALPHA component indicates one alphabet letter as defined in RFC 3986 and the ALPHA component is used to indicate an x-name matched component in a client URI. <path> begins with the matched x-name component to indicate a relative address to a leaf node. At least one nv field may be used for one x-name component. <val> indicates a node value of a node indicated by <path>. The nv field is "satisfied" with respect to a specific MO instance, which means that a leaf node indicated by <path> of the nv field in the MO instance has a value corresponding to <val>.

In the example of FIG. 13, the x-name component has three characters and may be expressed by "(", ")" and the ALPHA component. The ALPHA component in the x-name component may be used to match the nv field. For example, if the mo-inst component or the path-from-moroot component includes the x-name component "(x)", the nv field may have <path> including "(x)". In this case, the nv field may be regarded as matching the x-name component. For example, the nv field may have a form of "nv=(x)/...:...". If a plurality of nv fields is included, all the nv fields should match the x-name component. Accordingly, the DM client should find an nv field having the same ALPHA as the x-name component, for matching between the nv field and the x-name component.

FIG. 14 is a flowchart illustrating a method for resolving a URI using an x-name according to the present invention. The x-name component indicating the <x> node is applicable to an mo-inst component and a path-from-moroot component. Accordingly, the method of FIG. 14 may be used to resolve the path-from-moroot component of the instance URI in step 908 of FIG. 9. In addition, the method of FIG. 14 may be used to resolve the path-from-moroot component of the MOID URI in step 1212 of FIG. 12.

In step 1402, the DM client resolves the URI.

In step 1404, the DM client checks whether the URI is correct for predetermined syntax. For example, the DM client may check whether the URI is correct for the syntax shown in FIG. 13. If so, the method progresses to step 1406 and, otherwise, the method progresses to step 1416.

In step 1406, the DM client finds an <x> node, a real name of which is not found in the URI. Since an x-name designating the <x> node begins with "(" and ends in ")", an x-name which is not yet resolved may be found from x-names. If an unresolved <x> node is not present, the method progresses to step 1414 and, if the unresolved <x> node is present, the method progresses to step 1408.

In step 1408, the DM client finds an nv field necessary to find a real name of the <x> node. The nv field including the same ALPHA value as the ALPHA component of the <x> node included in the URI is found from the query component. If the nv field corresponding to the <x> node is found, the method progresses to step 1410 and, otherwise, the method progresses to step 1416.

In step 1410, the real name of the <x> node is found using the nv field. The nv field provides a specific node path (referred to as <path>) and a node value (referred to as <val>) based on the <x> node. Accordingly, the node indicated by the nv field is found and whether a node value stored in that node is coincident with a node value designated by <val> of the nv field is checked. Only one real name of the <x> node satisfying this condition should be present and, if a plurality of real names of the <x> node satisfying this condition is present or if no real name of the <x> node satisfying this condition is present, the URI and the nv field are not valid. If the name of the <x> node is uniquely determined, the method progresses to step 1412 and, otherwise, the method progresses to step 1416.

In step 1412, the name of the <x> node is successfully resolved because the real node name corresponding to the <x> node is uniquely found in step 1410. The method returns to step 1406 to find the unresolved <x> node.

In step 1414, the names of all the <x> nodes included in the URI are successfully resolved.

In step 1416, the URI is incorrect because the URI is incorrect for the syntax or the real name of the <x> node is not found.

URI Using Wildcard

In a URI using a wildcard, "*" is used to designate a plurality of nodes using one URI. "*" may be used for an unnamed node (or <x> node) only and a real name of a node should always be used for a named node. The wildcard character is not limited to "*" and another character may be used.

FIG. 15 is a diagram showing syntax expressing a URI according to the present invention. FIG. 15 shows an extension of the syntax of a client URI (or ClientURI) according to an instance URI, an MOID URI and a URI using an x-name, which includes an addressing scheme using a wildcard. The client URI (or ClientURI) may include an instance URI, an MOID URI, a URI using an x-name and a URI using a wildcard. The client URI (or ClientURI) is not limited to an expression according to the syntax of FIG. 15 and may be differently expressed within the scope of the present invention.

Referring to FIG. 15, an mo-inst component may be one of an MIID, an x-name, an empty string " ", and a wildcard character (e.g., "*"). In addition, a node-name component may be one of a real name, an x-name and a wildcard character (e.g., "*"). However, the x-name and the wildcard character (e.g., "*") may be used for an unnamed node (or <x> node) but may not be used for a named node. For example, the named node may be designated using a real node name and an unnamed node may be designated using one of a real name, an x-name and a wildcard character (e.g., "*").

The addressing scheme using the URI and the method of resolving the URI according to the present invention will now be described.

URI Addressing Scheme According to the Present Invention

Referring to FIG. 15 again, FIG. 15 shows a URI addressing scheme according to the present invention. As described above, the URI according to the present invention includes an instance URI, an MOID URI, a URI using an x-name and a URI using a wildcard and may be referred to as a client URI (or ClientURI). The addressing scheme shown in FIG. 15 is a URI format compatible with RFC 3986.

In the example of FIG. 15, an MOID component and an mo-inst component indicate MO instances and a path-from-moroot component indicates a specific node in an MO instance by describing a relative path from an MO instance root node. The MOID component indicates an MOID of an MO instance including a node indicated by a URI (e.g., ClientURI). Accordingly, the MOID component indicates a type of an MO instance including a node indicated by a URI. The mo-inst component may be one of the following components according to an ABNF format.

MIID: Indicates an identifier (MIID; MO instance ID) of an MO instance including a node, at which a URI (e.g., ClientURI) is targeted. The MIID should be a unique value between MO instances having the same MOID in a terminal. A pair of MOID and MIID may uniquely identify an MO instance in the terminal.

x-name: The x-name component is a node, a real name of which is not designated in a URI as an unknown value and the real name may be ascertained using an nv field corresponding thereto. Accordingly, the nv field corresponding to the x-name component used in the URI should be provided in the same URI. This component is expressed by three characters "(", ALPHA, ")" as in "(x)" and "(y)". ALPHA of the x-name should be uniquely assigned between all x-name components in one URI. However, ALPHA may not be uniquely assigned between different URIs. An nv field corresponding to a specific x-name component may be found based on the ALPHA component. The ALPHA component of the x-name and the ALPHA component of the nv field have the same value. In this case, the ALPHA component of the x-name and the ALPHA component of the nv field match each other.

Empty string (e.g., " "): The mo-inst component may become an empty string. The empty string may be used as the mo-inst component when the number of MO instances having the same MOID in the terminal is one. Accordingly, if only one MO instance having a specific MOID is present, a specific MO instance may be designated using the MOID without using the MIID.

Wildcard character (e.g., "*"): If a wildcard character is included in a path-from-moroot component, all nodes having the MOID specified in the URI are designated.

In the example of FIG. 15, the path-from-moroot component may be "/" if the MO instance root node is designated. Alternatively, if a specific node other than the root node is designated in the MO instance, the path-from-moroot component begins with the child node of the MO instance root node and may be composed of a sequence of at least one node-name component. In this case, the path-from-moroot component indicates a path from the child node of the MO instance root node to the specific node. If the path-from-moroot component is composed of a sequence of at least one node-name component, the node-name component may be identified by a delimiting character "/", for example. Each node-name component may be expressed one of the following components.

real-name component: This component indicates a real node name.

x-name component: This component may be used if a real node name is not known, as in an unnamed node (or <x> node). The x-name component is a node, a real name of which is not designated in a URI as an unknown value and the real name may be ascertained using an nv field corresponding thereto. Accordingly, the nv field corresponding to the x-name component used in the URI should be provided in the same URI. This component is expressed by three characters "(", ALPHA, ")" as in "(x)" and "(y)". ALPHA of the x-name should be uniquely assigned between all x-name components in one URI. However, ALPHA may not be uniquely assigned between different URIs. An nv field corresponding to a specific x-name component may be found based on the ALPHA component. The ALPHA component of the x-name and the ALPHA component of the nv field have the same value.

wildcard character (e.g., "*"): If a wildcard character is included in a path-from-moroot component, all nodes are designated at a location where the wildcard is specified.

The named node refers to a node, a name of which is determined in definition of an MO and an unnamed node refers to a node, a name of which is not determined in definition of the MO as in "<x>" but is determined when a node is created at runtime. The named node must be necessarily designated using a real-name component but the unnamed node may be designated using one of a real-name component, an x-name component and a wildcard. In definition of the MO, the unnamed node is expressed using "<" and ">" as in "<x>". However, in the URI according to the present invention, the unnamed node is expressed using "(" and ")" to be compatible with RFC 3986.

In the example of FIG. 15, the query component serves as additional information about a URI as described with reference to Table 2. The query component begins after "?" and ends by the end of the URI. "?" may or may not be included in the query component. The query component is composed of a sequence of "field=value" and each "field=value" is identified by "&".

As described with respect to Table 2, the query component may include an nv field. The nv field may have a form of "nv=<path>:<val>". <path> begins with "(", ALPHA and ")" and the ALPHA component of <path> is expressed by a character, similarly to the ALPHA component of the x-name component. The ALPHA component is used for the x-name component and the nv field and is used to represent a matching relationship between the x-name component and the nv field. That is, when the ALPHA component value of the x-name and the ALPHA component value of the nv field are identical, the x-name component and the nv field match each other. <path> of the nv field begins with the x-name component to indicate a relative path designating a specific leaf node. Since a plurality of nv fields corresponding to one x-name component may be present, a plurality of nv fields having the same ALPHA component value may be used for one URI. <val> designates a node value of a leaf node indicated by <path>. If the leaf node indicated by <path> has a node value indicated by <val> with respect to a specific MO instance, the nv field is said to be "satisfied" with respect to the MO instance.

Method of Resolving URI According to the Present Invention

The DM client receives and resolves a URI (e.g., ClientURI) to find a specific node indicated by the URI. If a wildcard is not used in the URI, the DM client should resolve the URI such that one unique node is designated in a terminal. If a wildcard is used, one URI may be resolved such that a plurality of nodes is designated in a terminal. If the wildcard is used, the DM client may execute a device management command with respect to all nodes matched by the URI and return a list of MO data of all nodes matched by the URI with respect to a GET command.

The process of resolving the URI at the DM client may include two processes. A first procedure is a procedure of finding an MO instance indicated by the URI and a second procedure is a procedure of finding a specific node indicated by the URI with respect to the MO instance found in the first procedure.

First procedure: The MO instance indicated by the URI is found using an MOID component and an mo-inst component of the URI. The mo-inst component may be one of an MIID component, an x-name component, an empty string and a wildcard, each of which should be resolved as follows.

MIID component: The DM client finds one unique MO instance having an MIID indicated by an MIID component and an MOID indicated by an MOID component. If no MO instance having the MOID and the MIID is found or a plurality of MO instances each having the MOID and the MIID is found, an error code is returned. If one unique MO instance is found, the second procedure is performed.

x-name component: If the mo-inst component includes an x-name component, the DM client finds one unique MO instance satisfying the MOID and an nv field corresponding to the x-name component. If no MO instance is found or if a plurality of MO instances is found, an error code is returned. If one unique MO instance is found, the second procedure is performed.

Empty string (e.g., " "): If only one MO instance having an MOID indicated by the MOID component is present in a terminal, an empty string may be used. Accordingly, if only one MO instance having the MOID is found in the terminal, the second procedure is performed. If no MO instance is found or if a plurality of MO instances is found, an error code is returned.

Wildcard (e.g., "*"): If one or more MO instances having the MOID are present, the second procedure is performed. In this case, all MO instances having the MOID are considered in the second procedure. If no MO instance having the MOID is present, an error code is returned.

Second procedure: The DM client resolves a path-from-moroot component of the URI with respect to the MO instance found in the first procedure to finally find a node indicated by the URI. As described above, if the path-from-moroot component is "/", an MO instance root node is designated. If the path-from-moroot component is not "/", the path-from-moroot component is a sequence of node-name components and the node-name components may include a real-name component, an x-name component or a wildcard. The real-name component, the x-name component or the wildcard may be resolved as follows.

real-name component: This component indicates a real node name.

x-name component: The DM component uniquely finds a real node indicated by the x-name component using an nv field corresponding thereto. If a plurality of nv fields corresponding thereto is present, a unique node satisfying all the nv fields should be found. If a unique node is not found, an error code may be returned.

wildcard (e.g., "*"): All nodes located at a location where a wildcard is used are designated.

FIG. 16 is a diagram showing definition of an MO including an <x> node and an MO instance. FIG. 16(a) shows definition of a specific MO and FIG. 16(b) shows an example of creating two MO instances with respect to the definition of the MO. Assume that the MO of FIG. 16(a) has an MOID of "urn:oma:mo:moid:1.0". The principle of the present invention is not limited to the specific MO shown in FIG. 16.

Referring to FIG. 16(a), the specific MO may be defined to include two <x> nodes 1602 and 1610. The <x> node 1602 is an MO instance root node and the <x> node 1610 is an interior node. Definition of the specific MO, the configuration and detailed information (e.g., subtrees of the specific MO) of the MO are defined using the <x> nodes 1602 and 1610 and the named node, but, in the MO instance, the names of the <x> nodes 1602 and 1610 are determined according to definition of the MO. As described above, if an absolute URI or a virtual URI is used and the DM server does not know the names of the <x> nodes 1602 and 1610, information about the MO should be first known in order to indicate the node under the <x> node by the URI. Accordingly, if the absolute URI or the virtual URI is used, efficiency may deteriorate.

Referring to FIG. 16(b), an MO instance 1630 for GPS sensor management and an MO instance 1660 for temperature sensor management may be created in a terminal. In this case, two MO instances having the same MOID may be present in a DM tree of the terminal. When the MO instance 1630 is created, assume that the MIID of the MO instance 1630 is set to "left", the node name of the <x> node 1602 is set to "moroot1", two nodes 1640 and 1646 are created with respect to the <x> node 1610 and the node names are respectively set to "1" and "2". When the MO instance 1660 is created, assume that the MIID of the MO instance 1660 is set to "right", the node name of the <x> node 1602 is set to "moroot2", two nodes 1672 and 1678 are created with respect to the <x> node 1610 and the node names are respectively set to "1" and "2". In this case, since the MO instances 1630 and 1660 have the same MOID "urn:oma:mo:moid:1.0", the addressing scheme according to the MOID URI is not applicable.

When the addressing scheme using the MIID according to the present invention is applied to the node 1632, the MOID is "urn:oma:mo:moid:1.0" and the MIID is "left". In addition, since the node 1632 is an MO instance root node, the path-from-moroot component is "/". In addition, since the x-name is not included in the URI, a query component is not necessary. Accordingly, if the instance URI according to the present invention is used, the URI of the node 1632 may be expressed by "urn:oma:mo:mold:1.0/left/".

In addition, if the addressing scheme using the x-name according to the present invention is applied in order to indicate the node 1644, the MOID is "urn:oma:mo:moid:1.0" and the MO instance 1630 may be expressed using the x-name. In this case, a corresponding nv field should be included in the query component. If the MO instance 1630 is indicated by the x-name component "(x)", the nv field may be indicated by "nv=(x)/ID:GPS". In addition, since the path-from-moroot component indicates a relative path from the node 1638, which is a child node of the MO instance root node, to the node 1644 and another <x> node 1640 is included in this path, the path-from-moroot component may be expressed by "/Data/(y)/Value". In this case, since the <x> node 1640 is indicated by the x-name component "(y)", a corresponding nv field may be expressed by "nv=(y)/Date:12.1". If the nv field is included in the query component and a plurality of nv fields is included, the fields may be identified by a delimiting character "&". Accordingly, the URI of the node 1644 using the x-name according to the present invention may be expressed by "urn:oma:mo:mold:1.0/(x)/Data/(y)/Value?nv=(x)/ID:GPS &nv=(y)/Date:12.1".

In contrast, if an absolute URI or a virtual URI is used, the name of each <x> node should be known. In order to know the name of the <x> node, information about all MO instances or information about the DM tree should be requested and received from the terminal. Accordingly, a significant burden is imposed on signaling and efficiency deteriorates. In contrast, if the addressing scheme using the x-name according to the present invention is used, the overall structure of the DM tree does not need to be known and the name of the <x> node does not need to be known.

According to the present invention, a plurality of nodes may be indicated using one URI. For example, a wildcard may be used in order to indicate the node 1636 and the node 1666 by one URI according to the present invention. In this case, since the MOID is "urn:oma:mo:moid:1.0" and the MO instance root nodes 1632 and 1662 are <x> nodes, the wildcard (e.g., "*") may be used. Then, the URI representing the node 1636 and the node 1666 according to the present invention may be expressed by "urn:oma:mo:moid:1.0/*/Setting".

Similarly, four nodes 1644, 1650, 1674 and 1680 may be expressed by one URI using the wildcard. Since the MO instance root node is expressed by the <x> node and a parent nodes of the four nodes 1644, 1650, 1674 and 1680 are expressed by the <x> node, one URI may be expressed by "urn:oma:mo:moid:1.0/*/Data/*/Value". Accordingly, a plurality of nodes may be expressed using one URI, thereby reducing the number of commands to be provided to the terminal. For example, if a Get command is used to read the values of the four nodes 1644, 1650, 1674 and 1680, since the four nodes 1644, 1650, 1674 and 1680 may be simultaneously indicated by one URI, the Get command is only sent once.

However, in the case of the absolute URI or the virtual URI, since only one node may be expressed by one URI, the Get command should be inefficiently sent four times in order to read the values of the four nodes 1644, 1650, 1674 and 1680.

The addressing schemes according to the present invention are not individually applied but may be applied together. For example, the MIID and the x-name may be used together. For example, if the MIID is already known, the MIID may be used without using the x-name, in order to designate the MO instance. However, the x-name may be used for the path-from-moroot component. For example, if the MIID and the x-name are used in order to express the URI indicating the node 1674, assume that the MIID of the MO instance is "right". In this case, in order to designate the MO instance, the MOID "urn:oma:mo:moid:1.0" and the MIID "right" may be used. In addition, the path-from-moroot component may be expressed by "/Data/(x)/Value". In this case, since the <x> node 1670 is designated by the x-name "(x)", a corresponding nv field may be expressed by "nv=(x)/Date:12.1". Accordingly, the URI of the node 1674 according to the present invention may be expressed by "urn:oma:mo:moid:1.0/right/Data/(x)Value?nv=(x)/Date: 12.1".

An addressing scheme using an MIID and a wildcard according to the present invention is possible. For example, if two nodes 1644 and 1650 are designated using one URI, the MO instance may be designated using the MOID and the MIID and two nodes 1644 and 1650 may be expressed using the wildcard in the path-from-moroot component. In this case, the URI of the nodes 1644 and 1650 according to the present invention may be expressed by "urn:oma:mo:moid: 1.0/left/Data/*/Value".

In addition, an addressing scheme using a combination of an x-name and a wildcard according to the present invention is possible. For example, if two nodes 1644 and 1650 are designated using one URI, the MO instance may be designated using the MOID and the x-name and two nodes 1644 and 1650 may be expressed using the wildcard in the path-from-moroot component. In this case, the URI of the nodes 1644 and 1650 according to the present invention may be expressed by "urn:oma:mo:moid:1.0/(x)/Data/*Value?nv=(x)/ID:GPS". As another example, if two nodes 1644 and 1674 are designated using one URI, the MO instance may be designated using the MOID and the wildcard and two nodes 1644 and 1674 may be expressed using the wildcard in the path-from-moroot component. In this case, the URI of the nodes 1644 and 1674 according to the present invention may be expressed by "urn:oma:mo:moid:1.0/*/ Data/(x)/Value?nv=(x)/Date:12.1".

In the description for the URI addressing scheme according to the present invention, an mo-inst component may be referred to as MO instance information and a path-from-moroot component may be referred to as a path from an MO instance root node to a specific node. In this case, the specific node indicates a node indicated by a URI. In addition, a query component may be referred to as query information. In addition, the delimiting characters are non-limiting examples and may be replaced by other delimiting characters.

Figure 17:
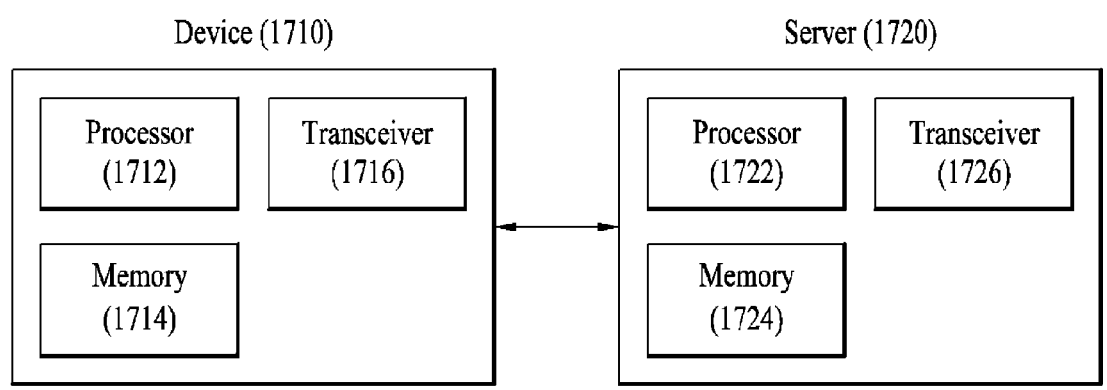
FIG. 17 is a diagram showing a device and a server, to which the present invention is applicable.

FIG. 17 is a block diagram showing the configuration of a device and a server to which the present invention is applicable.

As shown in FIG. 17, the device 1710, to which the present invention is applicable, includes a processor 1712, a memory 1714 and a transceiver module 1716. In addition, the server 1720, to which the present invention is applicable, includes a processor 1722, a memory 1724 and a transceiver module 1726.

The memories 1714 and 1724 are respectively connected to the processors 1712 to store software programs or commands for performing the methods according to the present invention and a variety of information related to operation of the processors 1712.

The processors 1712 and 1722 are respectively connected to the memories 1712 and 1722 and the transceiver modules 1716 and 1726 to control the memories and the transceiver modules. More specifically, the processors 1712 and 1722 respectively execute software programs or commands stored in the memories 1712 and 1722 to execute the methods. The processors 1712 and 1722 transmit and/or receive the above-described signals via the transceiver modules 1716 and 1726, respectively.

The above-described embodiments and modifications can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

For example, the method according to the present invention may be stored in a computer-readable recording medium (e.g., an internal memory, a flash memory, a hard disk, etc.) and may be implemented by codes or commands in a software module (or program) executed by a processor (e.g., a microprocessor).

The software module for implementing the embodiments of the present invention may include scripts, batch files, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The present invention may be used for a device such as a terminal and a server.

The invention claimed is:

1. A method of resolving a uniform resource identifier (URI) indicating a specific node for device management in a device, the method comprising:
finding at least one management object (MO) instance according to a management object identifier (MOID) and MO instance information included in the URI;
finding the specific node using a path from an MO instance root node included in the URI to the specific node within the at least one MO instance; and
performing the device management for the specific node,
wherein, if the MO instance information includes a management object instance identifier (MIID), the MIID is unique between MO instances having a same MOID in the device, and finding the at least one MO instance includes finding a unique MO instance having the MOID and the MIID, and returning errors if no MO instance having the MOID and the MIID is present or if a plurality of MO instances each having the MOID and the MIID are present,
wherein, if the MO instance information includes a node name consisting of a first delimiting character, an alphabet letter and a second delimiting character, the alphabet letter is uniquely assigned between node names comprising the first delimiting character and the second delimiting character in one URI, and the URI further includes at least one node value field, each of the at least one node value field includes a path from a location expressed by the MO instance information to a leaf node and a node value of the leaf node, and finding the at least one MO instance includes finding a unique MO instance for enabling the leaf node to have the node value with respect to each of the at least node value field, and
wherein each of the at least one node value field includes the node name consisting of the first delimiting character, the alphabet letter and the second delimiting character.

2. The method according to claim 1, wherein, if the MO instance information consists of an empty string, finding the at least one MO instance includes finding a unique MO instance having the MOID in the device.

3. The method according to claim 1, wherein, if the MO instance information consists of a wildcard character, finding the at least one MO instance includes finding all MO instances each having the MOID in the device.

4. The method according to claim 1, wherein, if the path from the MO instance root node to the specific node includes a node name consisting of a first delimiting character, an alphabet letter and a second delimiting character, the URI further includes at least one node value field, each of the at least one node value field includes a path from a location indicated by the node name to a leaf node and a node value of the leaf node, and finding the specific node includes finding a unique node for enabling the leaf node to have the node value with respect to each of the at least one node value field.

5. The method according to claim 4, wherein each of the at least one node value field includes the node name consisting of the first delimiting character, the alphabet letter and the second delimiting character.

6. The method according to claim 1, wherein, if the path from the MO instance root node to the specific node includes a node name consisting of a wildcard character, finding the specific node includes finding all nodes corresponding to a location of the wildcard character.

7. The method according to claim 1, wherein, if the path from the MO instance root node to the specific node consists of one delimiting character, finding the specific node includes finding the MO instance root node.

8. A device for resolving a uniform resource identifier (URI) indicating a specific node for device management, the device comprising:
a memory; and
a processor connected to the memory,
wherein the processor finds at least one management object (MO) instance according to a management object identifier (MOID) and MO instance information included in the URI, finds the specific node using a path from an MO instance root node included in the URI to the specific node within the at least one MO instance, and performs the device management for the specific node,
wherein, if the MO instance information includes a management object instance identifier (MIID), the MIID is unique between MO instances having a same MOID in the device, and finding the at least one MO instance includes finding a unique MO instance having the MOID and the MIID and returning errors if no MO instance having the MOID and the MIID is present or if a plurality of MO instances each having the MOID and the MIID are present,
wherein, if the MO instance information includes a node name consisting of a first delimiting character, an alphabet letter and a second delimiting character, the alphabet letter is uniquely assigned between node names comprising the first delimiting character and the second delimiting character in one URI, and the URI further includes at least one node value field, each of the at least one node value field includes a path from a location expressed by the MO instance information to a leaf node and a node value of the leaf node, and finding the at least one MO instance includes finding a unique MO instance for enabling the leaf node to have the node value with respect to each of the at least node value field, and wherein each of the at least one node value field includes the node name consisting of the first delimiting character, the alphabet letter and the second delimiting character.

9. The device according to claim 8, wherein, if the path from the MO instance root node to the specific node includes a node name consisting of a first delimiting character, an alphabet letter and a second delimiting character, the URI further includes at least one node value field, each of the at least one node value field includes a path from a location indicated by the node name to a leaf node and a node value of the leaf node, and finding the specific node includes finding a unique node for enabling the leaf node to have the node value with respect to each of the at least one node value field.

10. The device according to claim 9, wherein each of the at least one node value field includes the node name consisting of the first delimiting character, the alphabet letter and the second delimiting character.

11. The device according to claim 8, wherein, if the path from the MO instance root node to the specific node consists of one delimiting character, finding the specific node includes finding the MO instance root node.

12. The device according to claim 8, wherein, if the MO instance information consists of an empty string, finding the at least one MO instance includes finding a unique MO instance having the MOID in the device.

13. The device according to claim 8, wherein, if the MO instance information consists of a wildcard character, finding the at least one MO instance includes finding all MO instances each having the MOID in the device.

14. The device according to claim 8, wherein, if the path from the MO instance root node to the specific node includes a node name consisting of a wildcard character, finding the specific node includes finding all nodes corresponding to a location of the wildcard character.

* * * * *